United States Patent [19]

Garow et al.

[11] Patent Number: 4,738,903
[45] Date of Patent: Apr. 19, 1988

[54] PRESSURIZED FUEL CELL SYSTEM

[75] Inventors: Jay Garow, Vernon; Loren H. Otter, Bolton, both of Conn.

[73] Assignee: International Fuel Cells Corporation, South Windsor, Conn.

[21] Appl. No.: 938,488

[22] Filed: Dec. 3, 1986

[51] Int. Cl.[4] ............................................. H01M 8/04
[52] U.S. Cl. ........................................ 429/17; 429/19; 429/20; 429/25
[58] Field of Search ............... 429/17, 19, 26, 20, 429/27, 25, 72, 22, 24; 60/39.07, 39.25

[56] References Cited

U.S. PATENT DOCUMENTS

| | | | |
|---|---|---|---|
| 3,973,993 | 8/1976 | Bloomfield et al. | 136/86 |
| 3,976,507 | 8/1976 | Bloomfield | 429/17 |
| 3,982,962 | 9/1976 | Bloomfield | 429/19 |
| 4,004,947 | 1/1977 | Bloomfield | 429/17 |
| 4,304,823 | 12/1981 | Lemelson | 429/19 |

Primary Examiner—Anthony Skapars
Attorney, Agent, or Firm—William W. Jones

[57] ABSTRACT

The fuel cell power plant uses stacks which are supplied with compressed air from turbocompressors. The turbines on the turbocompressors are operated with expanding cathode exhaust gases from the stack. Product water is recovered from the cathode exhaust gases after the latter pass through the turbines. Flow and/or pressure sensors are disposed downstream of the compressors to monitor the air exiting the compressor. Should the sensors detect an abnormal condition, which could result from changes in power level, or ambient temperature, then the sensors will open a normally closed valve to divert coolant steam to the turbines to provide the increased energy needed to bring the turbines up to speed.

8 Claims, 1 Drawing Sheet

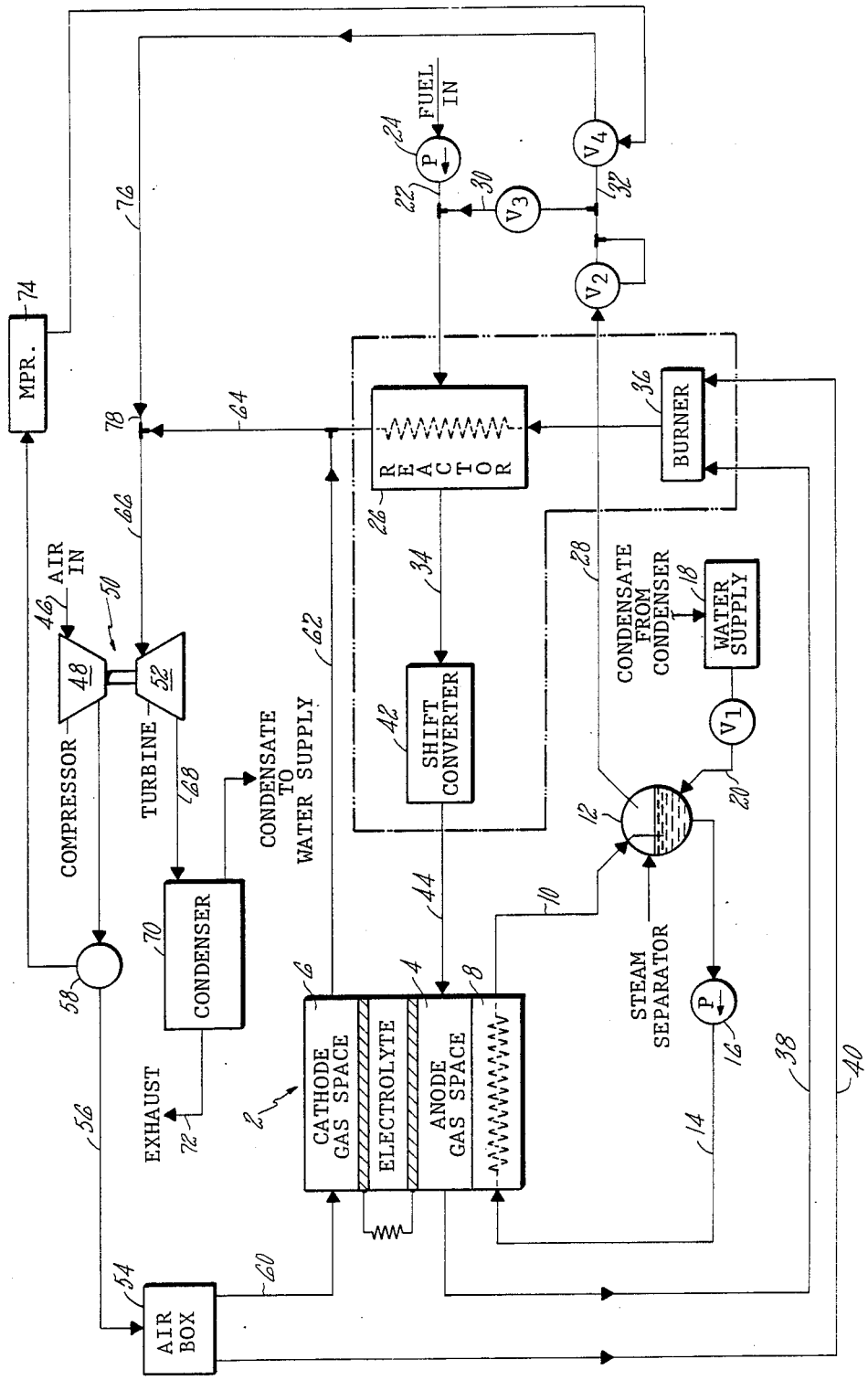

PRESSURIZED FUEL CELL SYSTEM

TECHNICAL FIELD

This invention relates to fuel cell power systems, and more particularly, to such systems which operate with compressed air provided by one or more turbocompressors.

BACKGROUND ART

Pressurized fuel cell systems wherein compressed air from turbocompressors is used on the cathode side of the fuel cell are known. U.S. Pat. No. 3,973,993, Bloomfield et. al., granted Aug. 10, 1976, discloses a pressurized fuel cell power plant wherein a turbocompressor is operated by passing moist cathode exhaust gas and reformer exhaust gas through the turbine side of the turbocompressor. At such times when the temperature of the fuel cell stack is to be reduced or prevented from rising, then some coolant steam will also be ducted into the cathode side of the stack and thence to the turbine.

U.S. Pat. No. 3,982,962, Bloomfield, granted Sept. 28, 1976, discloses a pressurized fuel cell power plant wherein the cathode side of the stack is provided with compressed air from a turbocompressor. The turbine on the turbocompressor is powered by steam from the stack cooling system. The steam is condensed to water after exiting the turbine.

Both of the aforesaid systems operate the turbine with a single fluid source which is generally sufficient for most operating conditions. There are some operating conditions, however, which require that more energy be inputted into the turbine. Such conditions may include high ambient operating temperatures which provide less dense air to be compressed, and/or the stack may be operating at less than full load thereby lowering the available energy in the cathode exhaust. Both of these conditions will require that extra energy be supplied to the turbocompressor so that it can compress the air to the preset constant for which it is designed. In the prior art systems, when such conditions occur, an auxiliary burner will be activated to supply the extra energy to the turbine. The auxiliary burner will be fueled by the raw fuel from whence the hydrogen is derived for the fuel cell anode side. It will be appreciated that the use of such an auxiliary burner adds expense to the system and is wasteful of total system energy since it requires consumption of fuel over and above that which is required by the stack for the electrochemical reaction.

DISCLOSURE OF INVENTION

This invention is directed to a pressurized fuel cell power plant which utilizes moist cathode exhaust to operate the turbocompressors at normal energy requirement levels. When energy required by the turbocompressors rise above the normal levels, steam which is exhausted from the stack coolant system is added to the cathode exhaust to the degree necessary to provide the needed additional energy. The system of this invention includes a sensor on the output side of the turbocompressor which senses whether the turbocompressor is operating at its intended capacity. The sensor is preferably connected to the power plant control software so that turbocompressor operation can be monitored by the power plant control.

The steam which is produced by the stack coolant system is normally fed to a reformer wherein it is used in the catalytic reaction which converts raw hydrocarbon fuel into the hydrogen-rich fuel needed for the anode side of the stack. When the plant control is told by the turbocompressor sensor that the turbocompressor needs more energy to operate at its intended capacity, the control routes some of the coolant exhaust steam to the turbocompressor to provide the needed additional energy. Thus, the energy-augmenting steam is only supplied to the turbocompressor at such times that the energy content of the cathode exhaust gases is insufficient to operate the turbocompressors at their intended or design capacity. The invention thus uses energy inherent in the system to provide on demand augmenting of the fluid energy used to operate the turbocompressors at their intended capacity.

It is therefore an object of this invention to provide a fuel cell power plant system which operates with compressed air provided by system turbocompressors.

It is a further object of this invention to provide a system of the character described wherein the turbocompressors are normally run by energy derived from cathode exhaust gases from cell stacks in the system.

It is yet another object of the invention to provide a system of the character described wherein additional energy for operating the turbocompressors will be supplied on an as needed basis by periodically diverting coolant exhaust steam to the turbocompressors when insufficient energy is supplied by the cathode exhaust gases.

These and other objects and advantages of the invention will become more readily apparent from the following detailed description of a preferred embodiment thereof when taken in conjunction with the accompanying drawing.

BRIEF DESCRIPTION OF THE DRAWING

The FIGURE is a schematic representation of a fuel cell power plant embodying the invention.

BEST MODE FOR CARRYING OUT THE INVENTION

Referring now to the drawing, the fuel cell stack is generally denoted by the numeral 2 and includes an anode side 4, a cathode side 6, and a coolant portion 8. The coolant portion 8 will use a liquid coolant such as water which is partially converted to steam in the stack during the cooling operation. The steam-water coolant mixture is exhausted from the stack 2 via line 10 to a steam separator 12 wherein the steam fraction is separated from the water fraction. The water fraction is then recirculated back to the coolant portion 8 through line 14 aided by pump 16. From time to time, water from a water supply source 18 will be added to the separator 12 via line 20 under the control of a valve $V_1$.

Raw hydrocarbon fuel such as natural gas enters the system through line 22 and is pressurized by pump 24 for passage into a reformer reactor 26. Steam from the separator 12 is fed to the line 22 through lines 28 and 30. A valve $V_2$ is disposed on line 28 to regulate the pressure of the steam in downstream line 32. Interposed between the lines 28 and 32 is a valve $V_3$ through which the steam is bled into the lines 30 and 22. The steam and raw fuel are catalytically reacted in the reformer 26 to produce a hydrogen-rich fuel which is passed into the line 34. Heat for the reformer 26 is provided by a burner 36 fueled by anode exhaust gases via line 38 and compressed air via line 40. The hydrogen-rich fuel passes through the lines 34 to a shift converter 42 and thence to the anode side 4 of the stack 2 via line 44.

Air for the cathode side 6 enters the system via line 46. The air is ambient air and is drawn from the line 46 into the compressor side 48 of a turbocompressor denoted generally by the numeral 50. The turbocompressor 50 also has a turbine side 52 which drives the compressor side 48. The ambient air is compressed in the compressor 48 and flows therefrom to an air box 54 via line 56. A sensor 58 is disposed in the output line 56 from the compressor 48 to sense the pressure of the compressed air, or its flow rate. The sensor 58 thus can monitor whether the turbocompressor is operating at its intended rate. If it is, then the pressure/flow rate of the air in the line 56 will be at a predetermined level, and, if it is not, then the pressure/flow rate of the air in the line 56 will be below the predetermined level. A portion of the compressed air in the air box 54 flows into the cathode side 6 of the stack 2 through line 60. Moist oxygen-depleted air is exhausted from the cathode side 6 of the stack 2 through line 62. This cathode exhaust will carry with it moisture occasioned by the reaction water formed in the stack by the electrochemcial reaction. The cathode exhaust is mixed with exhaust from the reformer 26 in line 64 and this mixture is carried to the inlet side of the turbine 52 through line 66 whereupon it is used to drive the turbine 52. Exhaust from the turbine 52 exits via line 68 and flows to a condenser 70 wherein water is removed from the turbine exhaust. The condenser 70 is exhausted of its dry gases via line 72. The condenser 70 is operably connected to the water supply 18 so that condensate from the former is transferred to the latter. The cathode exhaust and reformer exhaust mixture will constitute the driving fluid for the turbine 52 so long as the sensor 58 indicates that the output of the compressor 48 is at satisfactory design levels. The sensor 58 is operably connected to a system control microprocessor 74 which is programmed to control operation of the power plant. The control microprocessor 74 in turn is operably connected to a valve $V_4$ which is interposed between the line 32 and a branch line 76 which communicates with the line 66 via a one way check valve 78. As previously noted, the valve $V_2$ is operable to maintain steam pressure in the line 32 at a preset level so that the steam can be routed to the desired parts of the system. So long as the sensor 58 signals the control 74 that the compressor 48 is operating at the proper level, the control 74 keeps the valve $V_4$ closed. Thus, steam can only leave the line 32 through the valve $V_3$. When the sensor 58 senses that compressor output is below the design level, this information is transmitted to the control 74 whereupon the control 74 opens the valve $V_4$. This allows steam to enter the line 76, and flow past the check valve 78 into the line 66. The steam thus adds energy to the cathode/reformer exhaust mixture which causes the turbine 52 to drive the compressor at a faster rate. The valve $V_4$ can be a sequencing valve which sends spaced bursts of steam into the line 76, or, it can be a throttle valve which can send varying steady streams of steam into the line 76. As long as the control 74 is told that compressor output is sub-par, the valve $V_4$ will continue to add steam energy to the fluid stream driving the turbine 52. Once the compressor output rises to design levels, the sensor 58 will so signal the control 74, whereupon the control 74 will close the valve $V_4$.

It will be readily appreciated that the system of this invention provides for optimum operation of the compressed air supply during diverse operating conditions. The compressed air is supplied at a steady design level by augmenting the turbine driving fluid energy with additional energy supplied by normal operation of the power plant. Energy augmentation is supplied only on demand when compressor output is sensed to be below the design level. Conventional sensors, valves, ducting and controls are used which do not overly complicate the specifics of the system.

Since many changes and variations of the disclosed embodiment of this invention may be made without departing from the inventive concept, it is not intended to limit the invention otherwise than as required by the appended claims.

We claim:
1. A fuel cell power plant system comprising:
   (a) a fuel cell stack having anode means, cathode means and stack cooling means adapted to use a water coolant;
   (b) turbocompressor means operably connected to said cathode means for supplying compressed air to said cathode means;
   (c) first conduit means operably connected to an exhaust side of said cathode means and to said turbocompressor means, said first conduit means being operable to supply moist cathode exhaust gases to said turbocompressor means to drive the latter;
   (d) separator means;
   (e) second conduit means operably connected to an exhaust side of said cooling means and to said separator means, said second conduit means being operable to supply a water/steam coolant exhaust mixture from said cooling means to said separator means;
   (f) third conduit means operably connected to said separator means and to said turbocompressor means for ducting steam from said separator means to said turbocompressor means; and
   (g) control means including a sensor means and valve means cooperating to control the flow of steam from said separator means to said turbocompressor means, said sensor means being disposed on an output side of said turbocompressor means and being operable to sense a characteristic of the compressed air flowing from said turbocompressor means to said cathode means, and said valve means being disposed in said third conduit means and normally closed to block flow of steam from said separator means to said turbocompressor means, said control means further including actuating means operable to open said valve means to allow flow of steam from said separator means to said turbocompressor means at such times as said sensor means indicates, by virtue of said sensed compressed air characteristic, that said turbocompressor means requires additional energy, over and above that being supplied by the cathode exhaust gases, to operate at its designed level.

2. The system of claim 1 wherein said sensor means is a pressure sensor.

3. The system of claim 1 wherein said sensor means is a flow rate sensor.

4. The system of claim 1 wherein said valve means is a throttling valve.

5. The system of claim 1 further comprising water supply means operably connected to said separator means for periodically adding water to said separator means; condenser means operably connected to an exhaust side of said turbocompressor means, said condenser means being operable to condense water out of exhaust gases from said turbocompressor means; and means for transferring condensed water from said condenser means to said water supply means.

6. The system of claim 1 wherein said actuator means is a microprocessor.

7. In a fuel cell power plant system of the pressurized type having a fuel cell stack with anode means, cathode means and a stack coolant system which uses a water coolant, a method of operating a turbocompressor which pressurizes the stack, said method comprising the steps of:

(a) delivering moist cathode exhaust gases to said turbocompressor to supply energy needed to operate said turbocompressor at a predetermined design level;

(b) sensing a determinative characteristic of compressed air flowing from said turbocompressor to determine whether said turbocompressor is operating at or below said predetermined design level;

(c) providing a flow control means for controlling flow of coolant exhaust steam to said turbocompressor, said flow control means preventing flow of steam to said turbocompressor at such times as the latter is operating at said predetermined design level; and (d) providing actuator means responsive to sensed operation of said turbocompressor which sensed operation is below said predetermined design level for causing said flow control means to allow steam to flow to said turbocompressor until latter resumes operation at said predetermined design level.

8. The method of claim 7 comprising the further step of condensing water out of gases exhausted from said turbocompressor.

* * * * *